UNITED STATES PATENT OFFICE.

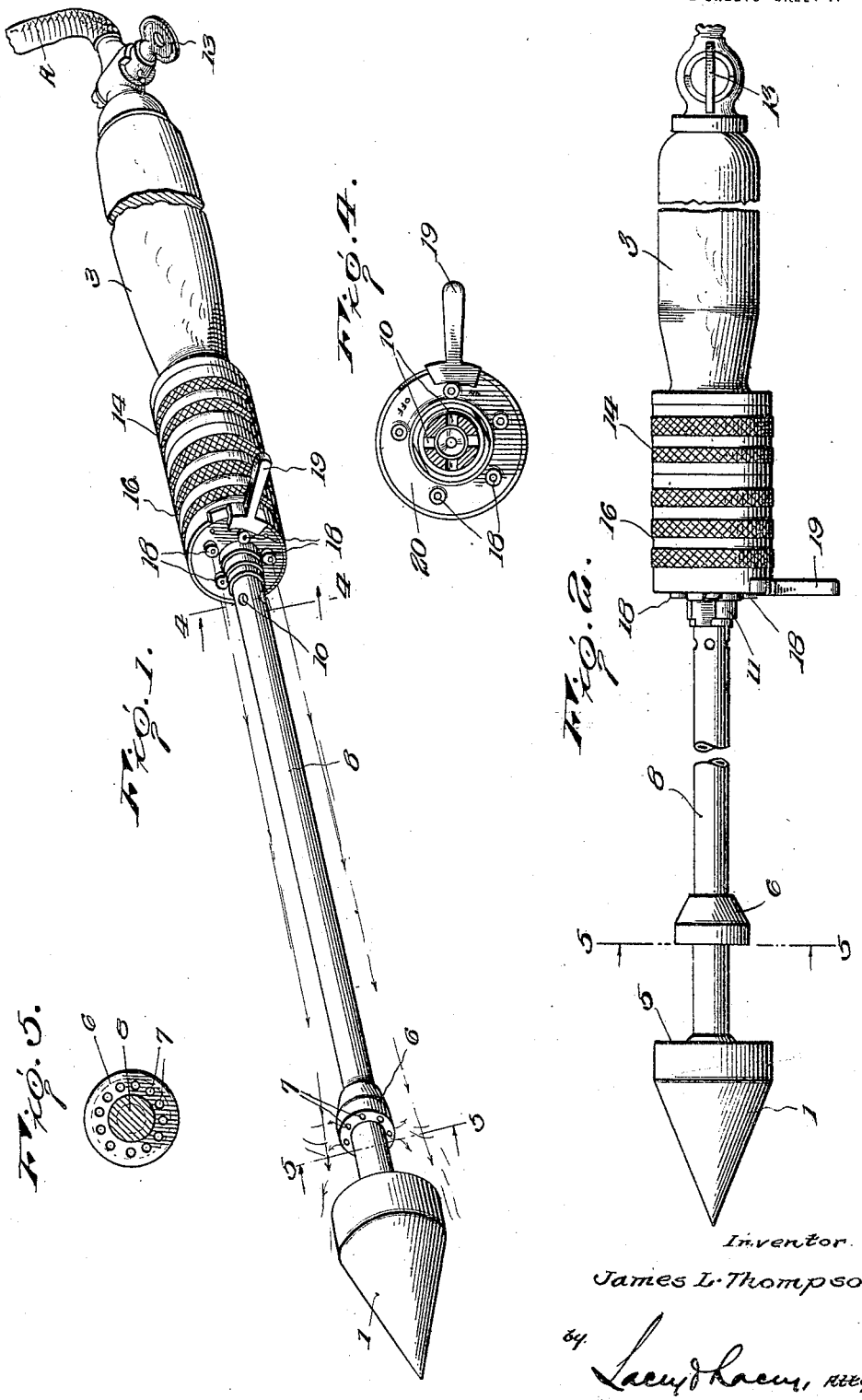

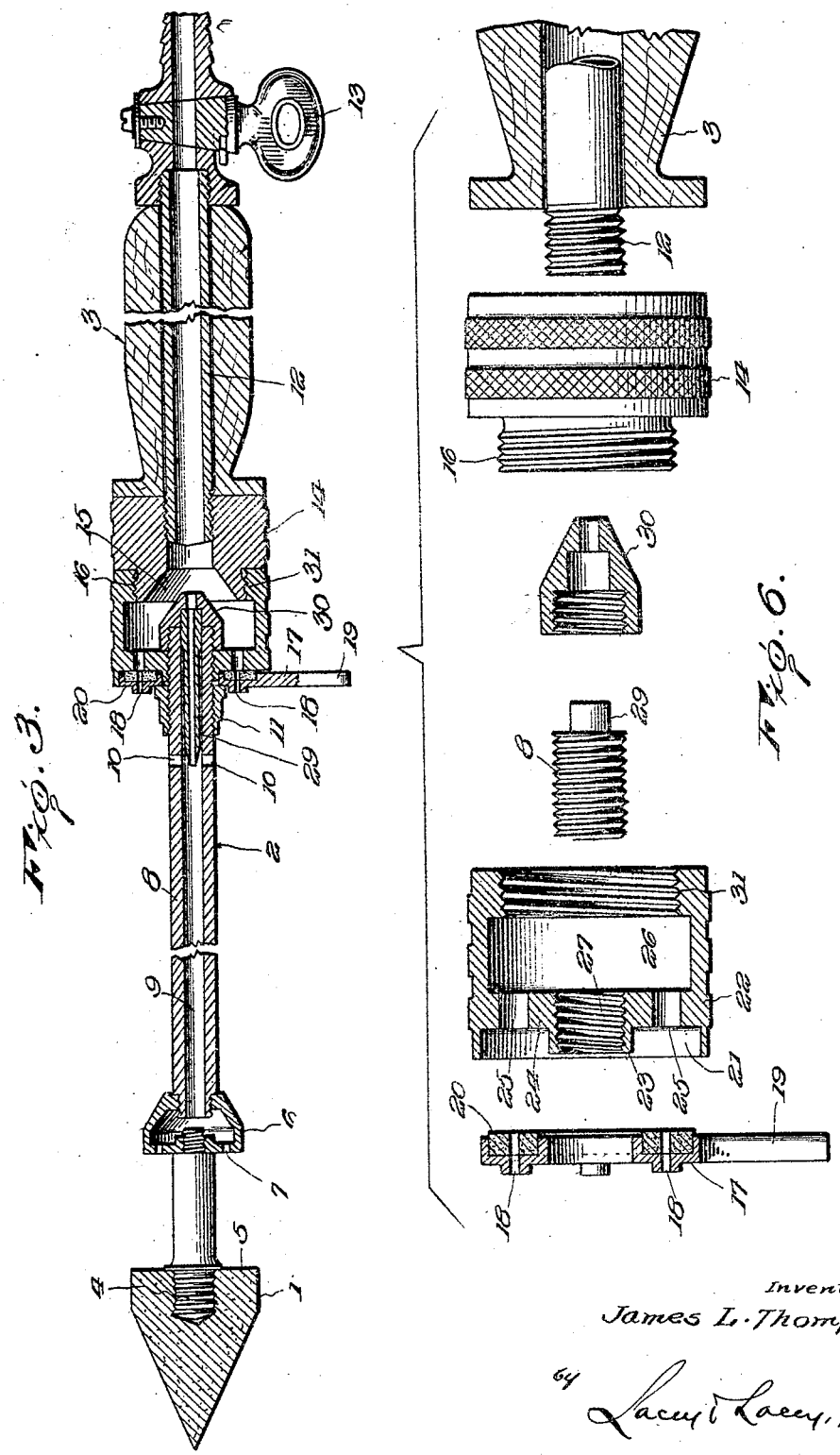

JAMES L. THOMPSON, OF GREENSBURG, PENNSYLVANIA, ASSIGNOR OF ONE-HALF TO HARRY A. MURRAY, OF GREENSBURG, PENNSYLVANIA.

SOLDERING-IRON.

1,371,711.     Specification of Letters Patent.      Patented Mar. 15, 1921.

Application filed November 21, 1919. Serial No. 339,542.

*To all whom it may concern:*

Be it known that I, JAMES L. THOMPSON, a citizen of the United States, residing at Greensburg, in the county of Westmoreland and State of Pennsylvania, have invented certain new and useful Improvements in Soldering-Irons, of which the following is a specification.

This invention relates to a gas soldering iron, an object of which is to provide an iron having means for initially heating the soldering point to the proper temperature, and including a pilot which will, without regulation by the operator, maintain the proper soldering temperature in the point after the initial heating means has been extinguished.

In the usual types of gas heated soldering irons the Bunsen principle is used exclusively to heat the point by giving full play of the Bunsen flame and, after the iron has been heated to the proper temperature the flame is modulated so as to continue the heating. However, due to the fact that any modulation of the Bunsen flame changes the position and dimensions of the heating cone with respect to the soldering point it is difficult to always maintain a uniform temperature in the soldering point during the course of a job.

The principal object of the present invention is to eliminate the difficulty above referred to by providing a means for initially heating the point by enveloping the same in a cloud of burning gas emitted from a different source than the flame which maintains the temperature of the soldering point, and having the temperature of the soldering point maintained by a Bunsen flame of fixed proportions so that the exact temperature of the soldering point is always maintained and thus the operator of the iron may be assured that his iron is going to remain of uniform heat from the start to the finish of a particular job, and furthermore, will be of the same heat each time that he uses it.

In the drawings:

Figure 1 is a view in perspective, of a soldering iron constructed according to the present invention;

Fig. 2 is a side elevation of the soldering iron;

Fig. 3 is a longitudinal section on the center line of the iron;

Fig. 4 is a transverse section on line 4—4 of Fig. 3;

Fig. 5 is a transverse section on line 5—5 of Fig. 2;

Fig. 6 is a disassembled view of the regulating means incorporated in the handle of the iron.

In detail the iron comprises a copper soldering point 1 connected by a stem 2 with a handle 3. The stem 2 is screwed or otherwise secured to the point 1 as shown at 4. Located a short distance from the rear face 5 of the point 1 is an annular mixing chamber 6 of the frusto-conical form with the apex side toward the handle 3. The forward face of the mixing chamber 6 has an annular series of perforations 7 which direct the gas against the face 5 of the point 1. Connecting with the annular mixing chamber 6 is the remaining section 8 of the stem 2. The section 8 of the stem 2 is tubular as shown at 9, and adjacent the handle 3 said section 8 is perforated transversely as shown at 10 to admit air. The section 8 is threaded at the handle end to receive a threaded collar 11.

The handle 3 is hollow, as shown, to receive a pipe 12 connecting with a stop cock 13 of the usual form. The other end of the pipe 12 is threaded into a ferrule member 14 bored out conically as shown at 15 and threaded as at 16.

A gas regulating valve member 17 of disk form is provided with an annular series of outlets 18 and a handle 19. Said disk member 17 is recessed to receive an asbestos, leather, or fiber packing disk 20. The valve member 17 fits within an annular recess 21 in the valve body 22 which carries a boss 23 over which the valve member 17 fits and seats against the face of a wall 24 having perforations 25 leading to a gas chamber 26. A threaded aperture 27 extends through the boss 23 and wall 24 and receives the end of section 8 of stem 2, the valve member 17 being confined between collar 11 and wall 24 but being movable rotatably to close or open the outlets 18 to the interior of the gas chamber 26, stop means being provided for limiting the rotative movement of this valve member 17 by cutting away a portion of the lip 28 formed by recessing the body member 22 and permitting handle 19 to rest in the cut-away portion of such lip. Within the end of section 8 of stem 2 is a pilot nozzle 29 which terminates adjacent air openings 10, thereby feeding a mixture of air and gas to the chamber 6 from which it is expelled through openings 7 against the rear wall 5 of the soldering point 1, so that when the gas is ignited it heats the said soldering point 1 and the parts are so proportioned that the Bunsen flame emitted therefrom is of the proper proportion to maintain the soldering point at a soldering temperature after the same has been initially heated. Screwed over the end of section 8 of stem 2 and securing nozzle 29 in place is a conical member 30 which also acts as a check against accidental removal of stem 2 from the valve body. The upper end of the valve body 22 is threaded as shown at 31 to receive the threaded end 16 of the ferrule member 14, the conical surface 15 of which coöperates with the cone 30 to form a passage directing the gas to openings 25 in the wall 24 of the valve body 22.

When the iron is assembled as above the operation of the same is as follows:

The gas cock 13 is connected by the usual flexible tube A with any source of gas supply, the handle 19 is moved to the "off position" and the stop cock 13 turned on. Gas flows through the nozzle 29 past the air openings 10 where it takes on the proper proportions of air forming a combustible mixture and thence flows into the chamber 6 from which it is emitted through openings 7 against the rear face 5 of the soldering point 1. The gas is ignited between the face 5 and the mixing chamber 6 and the Bunsen flame thus formed plays evenly on the face 5 of the part 1. However, when the iron is cold this is insufficient to heat it quickly to the required temperature so the handle 19 is moved to the "on position" and jets of gas flow from the openings 18 exteriorly along the stem 2 and past the annular chamber 6 taking on air and enveloping the soldering point 1 in a cloud of combustible gas burning with a blue flame between the annular chamber 6 and around the point and heating such point to the requisite soldering temperature in a very short space of time, after which the handle 19 is again moved to the off position and the pilot flame emitted from the openings 7 will serve to maintain the point 1 at the proper soldering temperature due to the fact that the parts of this pilot burner are proportioned so as to give the exact flame required without any regulation whatsoever.

It will be observed that the construction of soldering iron herein described is such that the same may be used, when the initial heating means is open, for a blow torch to heat parts which it is intended to sweat together, thus eliminating the use of the usual torch for this purpose and, in effect, making the soldering iron a combination tool.

From the foregoing description it will be apparent that the specific construction of iron herein described will accomplish the purposes of the invention, but it is nevertheless to be understood that in carrying the invention into practice I may resort to any and all modifications falling within the scope of the appended claims defining the invention.

Having thus described the invention, what is claimed as new is:

1. In a gas heated soldering iron, a soldering point having a stem provided with a handle, gas outlet means adjacent the handle for directing a current of gas exteriorly along said stem to the soldering point, and pilot means adjacent the point to ignite the gas enveloping the point.

2. In a gas heated soldering iron, a soldering point having a stem provided with a pilot burner adjacent the soldering point, and a handle having adjustable means for feeding a current of gas exteriorly along the stem to envelop the soldering point in a cloud of gas and air where such mixture is ignited by the pilot means.

3. In a gas heated soldering iron, a soldering point having a stem provided with a pilot burner adjacent the soldering point for maintaining a soldering temperature in the point, and initial heating means for feeding a current of gas exteriorly along said stem to envelop the soldering point in a cloud of gas and air where said mixture is ignited by the pilot means.

4. In a gas heated soldering iron, a soldering point, a pilot burner adjacent the point, and means remote from the point to feed an enveloping cloud of gas and air to the point for initially heating the same, said pilot burner constituting means for igniting the combustible mixture enveloping the point.

5. In a soldering iron, a soldering point, a hollow stem having a mixing chamber provided with apertures for directing pilot jets on said point, a handle having a gas passage in communication with said stem, and a valve in said handle for directing jets of gas exteriorly along said stem to envelop the point in an ignited cloud of gas and air.

6. In a gas soldering iron, a soldering point, a stem having a mixing chamber provided with outlets directing pilot flames onto the soldering point, air inlets in the stem, a pilot nozzle at one end of the stem, a handle having a gas inlet and a chamber provided with outlets, a valve disk having jet outlets movable into registration with said chamber outlets to direct jets of gas along said stem to the soldering point for ignition by the pilot flame, said mixing chamber being of frusto-conical shape with its sloping surface presented toward the valve disk.

In testimony whereof I affix my signature.

JAMES L. THOMPSON. [L. S.]